US010526954B2

(12) United States Patent
John et al.

(10) Patent No.: US 10,526,954 B2
(45) Date of Patent: Jan. 7, 2020

(54) TURBOCHARGER ASSEMBLY

(71) Applicant: Garrett Transportation I Inc., Torrance, CA (US)

(72) Inventors: Poomkuzhimannil Zachariah John, Bangalore (IN); Giorgio Figura, Epinal (FR); Sunil Dayalan, Chennai (IN); Santosh V, Hyderabad (IN); Maltesh Kolur, Bangalore (IN); Suryakant Gupta, Benares (IN)

(73) Assignee: Garrett Transportation I Inc., Torrance, CA (US)

( * ) Notice: Subject to any disclaimer, the term of this patent is extended or adjusted under 35 U.S.C. 154(b) by 983 days.

(21) Appl. No.: 14/820,523

(22) Filed: Aug. 6, 2015

(65) Prior Publication Data
US 2017/0037773 A1 Feb. 9, 2017

(51) Int. Cl.
*F02B 37/02* (2006.01)
*F01D 25/24* (2006.01)
*F02B 37/18* (2006.01)
*F02C 6/12* (2006.01)

(52) U.S. Cl.
CPC .............. *F02B 37/02* (2013.01); *F01D 25/24* (2013.01); *F02B 37/18* (2013.01); *F02C 6/12* (2013.01); *F05D 2220/40* (2013.01); *F05D 2230/21* (2013.01); *F05D 2240/12* (2013.01); *F05D 2240/15* (2013.01); *F05D 2300/501* (2013.01); *F05D 2300/5024* (2013.01); *F05D 2300/522* (2013.01); *Y02T 10/144* (2013.01)

(58) Field of Classification Search
CPC .......... F01D 9/026; F01D 25/24; F02B 37/02; F02B 37/18; F02C 6/12; F05D 2220/40
See application file for complete search history.

(56) References Cited

U.S. PATENT DOCUMENTS

| 3,054,554 | A |  | 12/1960 | Buchi |
| 3,574,478 | A |  | 4/1971 | Toth et al. |
| 3,748,059 | A | * | 7/1973 | Miller ..................... F01D 25/08 |
|  |  |  |  | 415/136 |
| 4,245,953 | A | * | 1/1981 | Milton ................... F01D 17/105 |
|  |  |  |  | 415/144 |
| 4,521,155 | A |  | 6/1985 | Osborn |
| 4,676,717 | A |  | 6/1987 | Willyard, Jr. et al. |
| 5,246,335 | A |  | 9/1993 | Mitsubori et al. |

(Continued)

FOREIGN PATENT DOCUMENTS

| DE | 43 30 380 A1 | 3/1995 |
| DE | 10028161 C2 | 12/2001 |

(Continued)

OTHER PUBLICATIONS

EP Application No. 16182081.6-1610, Extended European Search Report, dated Dec. 22, 2016 (9 pages).

*Primary Examiner* — Jason D Shanske
*Assistant Examiner* — Julian B Getachew
(74) *Attorney, Agent, or Firm* — Brian J. Pangrle

(57) ABSTRACT

A turbocharger assembly can include a center housing; a turbine housing; and an insert disposed between the center housing and the turbine housing where a surface of the turbine housing and a first surface of the insert define a volute and where a surface of the center housing and a second surface of the insert define a chamber.

19 Claims, 12 Drawing Sheets

(56) References Cited

U.S. PATENT DOCUMENTS

| | | | |
|---|---|---|---|
| 5,403,150 A * | 4/1995 | McEachern, Jr. | F01D 25/125 |
| | | | 384/478 |
| 6,193,463 B1 | 2/2001 | Adeff et al. | |
| 6,638,007 B2 | 10/2003 | Barholoma et al. | |
| 7,918,023 B2 * | 4/2011 | Sausse | F01D 9/04 |
| | | | 29/889.2 |
| 8,240,984 B2 | 8/2012 | Noelle | |
| 2008/0080966 A1 * | 4/2008 | Ueno | F01D 25/16 |
| | | | 415/112 |
| 2008/0223956 A1 * | 9/2008 | Jinnai | F01D 17/165 |
| | | | 239/265.35 |
| 2014/0050576 A1 | 2/2014 | Li et al. | |

FOREIGN PATENT DOCUMENTS

| | | |
|---|---|---|
| DE | 102006028553 A1 | 12/2007 |
| DE | 10 2010 051359 A1 | 5/2012 |
| EP | 122328 A1 | 10/1984 |
| EP | 122328 B1 | 3/1987 |
| EP | 526965 A2 | 4/1993 |
| EP | 0 791 908 A2 | 7/1995 |
| EP | 526965 B1 | 1/1997 |
| EP | 1 965 039 A2 | 9/2008 |
| EP | 2 770 167 A1 | 8/2014 |
| GB | 863361 A | 3/1961 |
| GB | 881373 A | 11/1961 |
| JP | 2001-234753 A | 8/2001 |

* cited by examiner ial cast turbine
TURBOCHARGER ASSEMBLY

TECHNICAL FIELD

Subject matter disclosed herein relates generally to turbomachinery for internal combustion engines and, in particular, to turbochargers.

BACKGROUND

Turbochargers are frequently utilized to increase output of an internal combustion engine. A turbocharger can include a shaft rotatably supported by a bearing or bearings. As a turbocharger shaft may be configured to rotate at high rotational speeds, lubricant may be provided to reduce friction via lubricant films and to transfer heat energy (e.g., due to friction, due to exhaust gas, etc.).

BRIEF DESCRIPTION OF THE DRAWINGS

A more complete understanding of the various methods, devices, assemblies, systems, arrangements, etc., described herein, and equivalents thereof, may be had by reference to the following detailed description when taken in conjunction with examples shown in the accompanying drawings where.

DETAILED DESCRIPTION

Figure 1:
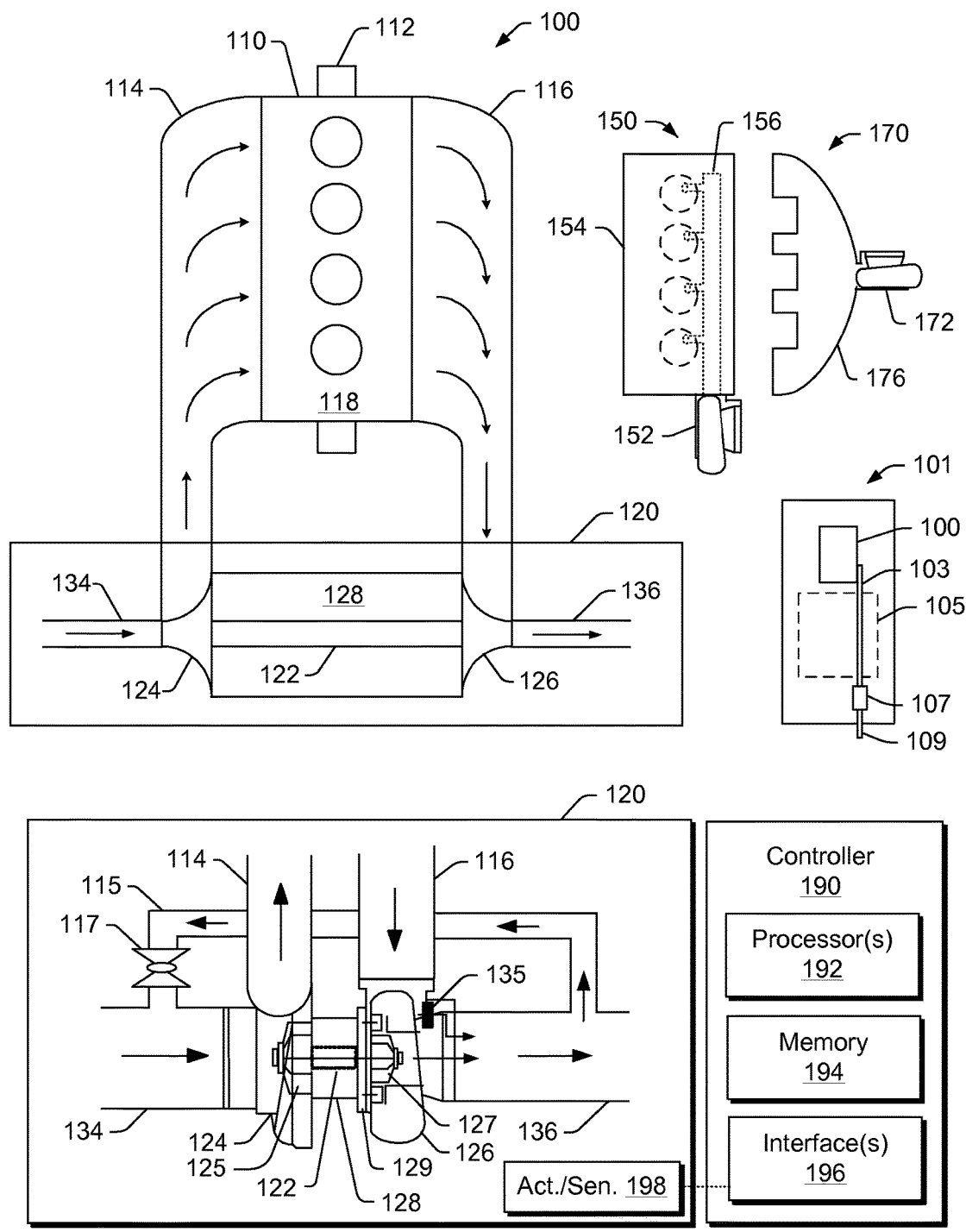
FIG. 1 is a diagram of a turbocharger and an internal combustion engine along with a controller.

Turbochargers are frequently utilized to increase output of an internal combustion engine. Referring to FIG. 1, as an example, a system 100 can include an internal combustion engine 110 and a turbocharger 120. As shown in FIG. 1, the system 100 may be part of a vehicle 101 where the system 100 is disposed in an engine compartment and connected to an exhaust conduit 103 that directs exhaust to an exhaust outlet 109, for example, located behind a passenger compartment 105. In the example of FIG. 1, a treatment unit 107 may be provided to treat exhaust (e.g., to reduce emissions via catalytic conversion of molecules, etc.).

As shown in FIG. 1, the internal combustion engine 110 includes an engine block 118 housing one or more combustion chambers that operatively drive a shaft 112 (e.g., via pistons) as well as an intake port 114 that provides a flow path for air to the engine block 118 and an exhaust port 116 that provides a flow path for exhaust from the engine block 118.

The turbocharger 120 can act to extract energy from the exhaust and to provide energy to intake air, which may be combined with fuel to form combustion gas. As shown in FIG. 1, the turbocharger 120 includes an air inlet 134, a shaft 122, a compressor housing assembly 124 for a compressor wheel 125, a turbine housing assembly 126 for a turbine wheel 127, another housing assembly 128 and an exhaust outlet 136. The housing 128 may be referred to as a center housing assembly as it is disposed between the compressor housing assembly 124 and the turbine housing assembly 126. The shaft 122 may be a shaft assembly that includes a variety of components. The shaft 122 may be rotatably supported by a bearing system (e.g., journal bearing(s), rolling element bearing(s), etc.) disposed in the housing assembly 128 (e.g., in a bore defined by one or more bore walls) such that rotation of the turbine wheel 127 causes rotation of the compressor wheel 125 (e.g., as rotatably coupled by the shaft 122). As an example a center housing rotating assembly (CHRA) can include the compressor wheel 125, the turbine wheel 127, the shaft 122, the housing assembly 128 and various other components (e.g., a compressor side plate disposed at an axial location between the compressor wheel 125 and the housing assembly 128).

In the example of FIG. 1, a variable geometry assembly 129 is shown as being, in part, disposed between the housing assembly 128 and the housing assembly 126. Such a variable geometry assembly may include vanes or other components to vary geometry of passages that lead to a turbine wheel space in the turbine housing assembly 126. As an example, a variable geometry compressor assembly may be provided.

In the example of FIG. 1, a wastegate valve (or simply wastegate) 135 is positioned proximate to an exhaust inlet of the turbine housing assembly 126. The wastegate valve 135 can be controlled to allow at least some exhaust from the exhaust port 116 to bypass the turbine wheel 127. Various wastegates, wastegate components, etc., may be applied to a conventional fixed nozzle turbine, a fixed-vaned nozzle turbine, a variable nozzle turbine, a twin scroll turbocharger, etc. As an example, a wastegate may be an internal wastegate (e.g., at least partially internal to a turbine housing). As an example, a wastegate may be an external wastegate (e.g., operatively coupled to a conduit in fluid communication with a turbine housing).

In the example of FIG. 1, an exhaust gas recirculation (EGR) conduit 115 is also shown, which may be provided, optionally with one or more valves 117, for example, to allow exhaust to flow to a position upstream the compressor wheel 125.

FIG. 1 also shows an example arrangement 150 for flow of exhaust to an exhaust turbine housing assembly 152 and another example arrangement 170 for flow of exhaust to an exhaust turbine housing assembly 172. In the arrangement 150, a cylinder head 154 includes passages 156 within to direct exhaust from cylinders to the turbine housing assembly 152 while in the arrangement 170, a manifold 176 provides for mounting of the turbine housing assembly 172, for example, without any separate, intermediate length of exhaust piping. In the example arrangements 150 and 170, the turbine housing assemblies 152 and 172 may be configured for use with a wastegate, variable geometry assembly, etc.

In FIG. 1, an example of a controller 190 is shown as including one or more processors 192, memory 194 and one or more interfaces 196. Such a controller may include circuitry such as circuitry of an engine control unit (ECU). As described herein, various methods or techniques may optionally be implemented in conjunction with a controller, for example, through control logic. Control logic may depend on one or more engine operating conditions (e.g., turbo rpm, engine rpm, temperature, load, lubricant, cooling, etc.). For example, sensors may transmit information to the controller 190 via the one or more interfaces 196. Control logic may rely on such information and, in turn, the controller 190 may output control signals to control engine operation. The controller 190 may be configured to control lubricant flow, temperature, a variable geometry assembly (e.g., variable geometry compressor or turbine), a wastegate (e.g., via an actuator), an electric motor, or one or more other components associated with an engine, a turbocharger (or turbochargers), etc. As an example, the turbocharger 120 may include one or more actuators and/or one or more sensors 198 that may be, for example, coupled to an interface or interfaces 196 of the controller 190. As an example, the wastegate 135 may be controlled by a controller that includes an actuator responsive to an electrical signal, a pressure signal, etc. As an example, an actuator for a wastegate may be a mechanical actuator, for example, that may operate without a need for electrical power (e.g., consider a mechanical actuator configured to respond to a pressure signal supplied via a conduit).

Figure 2:
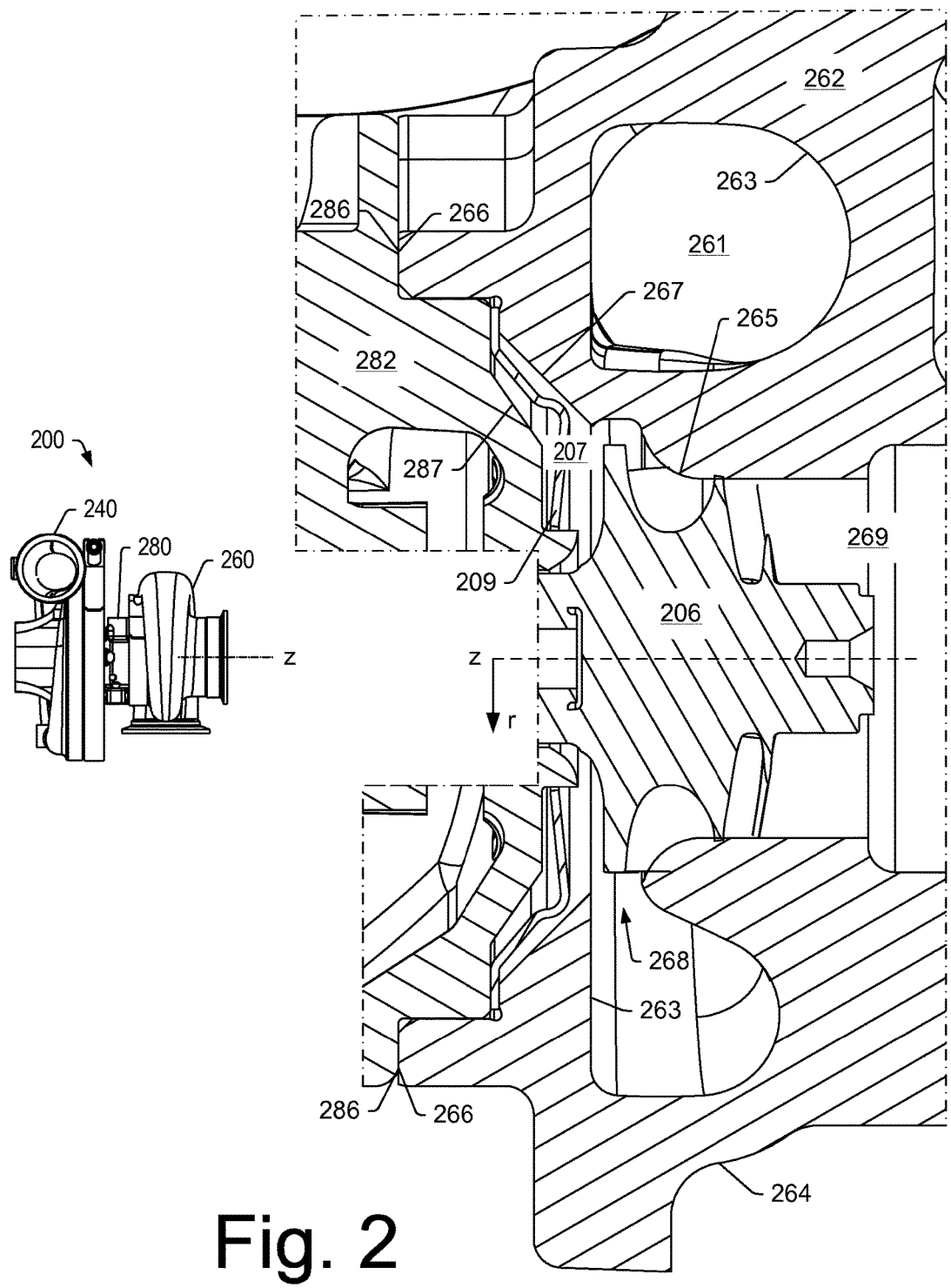
FIG. 2 is a side view and a cross-sectional view of an example of an assembly that includes a unitary cast turbine housing.

FIG. 2 shows an example of a turbocharger 200 that includes a compressor assembly 240, a turbine assembly 260 and a center assembly 280 and FIG. 2 also shows a cross-sectional view of a portion of the turbocharger 200 that includes a portion of the turbine assembly 260 and a portion of the center assembly 280. As shown in FIG. 2B, the turbine assembly 260 includes a volute 261 (e.g., a scroll that spirals with diminishing cross-sectional flow area for exhaust gas) that is defined by a unitary cast turbine housing 262, particularly, an interior surface 263 of the unitary cast turbine housing 262. For example, a casting process can include sand casting or sand molded casting. In such an example, sand may be used as a mold material.

One or more cores may be used in a casting process to cast a housing where, for example, passages in the housing may be created in a negative manner with respect to positive features of at least one core. As an example, a casting process may be a gravity-pour sand casting process. As an example, a housing may be made of hardened molten material (e.g., metal, alloy, etc.) that is shaped at least in part by at least one core. As an example, a core may be made of compacted sand, which may be disintegrated and removed from a cast housing after the material forming the cast housing has solidified and cooled.

Referring to the unitary cast turbine housing 262, a core may be used to form the volute 261 where the core defines the metes and bounds of the interior surface 263. Further, compact sand may be used to define the metes and bounds of an exterior surface 264 of the unitary cast turbine housing 262. Yet further, the exterior surface 264 can include a mating portion 266, for example, to operatively couple the unitary cast turbine housing 262 to the center assembly 280.

As shown in FIG. 2, the unitary cast turbine housing 262 includes a shroud surface 265, a chamber surface 267, a throat 268 that is a fluid passage for exhaust gas to pass from the volute 261 to a turbine wheel space defined in part by the shroud surface 265, and an outlet passage 269 that extends to an exhaust gas opening of the unitary cast turbine housing 262. Various features of the unitary cast turbine housing 262 may be formed via casting and optionally finished via machining a unitary cast piece as removed from a mold. For example, the mating portion 266 may be finished via machining to achieve an appropriate fit with the center assembly 280.

As to the center assembly 280, FIG. 2 shows a center housing 282 that is operatively coupled to the unitary cast turbine housing 262. As shown, the center housing 282 includes a mating portion 286 that can contact the mating portion 266 of the unitary cast turbine housing 262. Specifically, the mating portion 286 of the center housing 282 includes a male boss or extension that is received in part by a cylindrical female opening formed by the mating portion 266 of the unitary cast turbine housing 262. When mated, the center housing 282 and the unitary cast turbine housing 262 define a chamber 207. As shown, the chamber 207 is defined by the chamber surface 267 of the unitary cast turbine housing 262 and a chamber surface 287 of the center housing 282. Within the chamber 207, a heat shield 207 is disposed that can act to diminish heat transfer from hot exhaust gas flowing in the volute 261 of the unitary cast turbine housing 262 to the center housing 282. In such an approach, the chamber 207 and the heat shield 209 may diminish heating of lubricant that flows in the center housing 282 and to, for example, one or more bearings disposed within a bore of the center housing 282.

As to a method of assembly, a center housing rotating assembly (CHRA) may be pieced together followed by fitting the unitary cast turbine housing 262 to the CHRA with the heat shield 209 disposed in the chamber 207 as formed by the chamber surface 267 and the chamber surface 287.

FIG. 2 also shows a turbine wheel 206 disposed at least in part in a turbine wheel space defined at least in part by the unitary cast turbine housing 262. The turbine wheel 206 includes blades where contours of the blades form a clearance with the shroud surface 265 of the unitary cast turbine housing 262. Again, during operation, exhaust gas flows into the volute 261 (e.g., via an inlet to the unitary cast turbine housing 262) then via the throat 268 to the turbine wheel space such that the turbine wheel 206 can rotate and extract energy from the exhaust gas. Exhaust gas can then flow at least in part axially in the outlet passage 269 and, for example, onto an exhaust gas conduit or conduits, which may include, for example, one or more treatment units (e.g., catalytic converters, noise mufflers, etc.).

Figure 3:
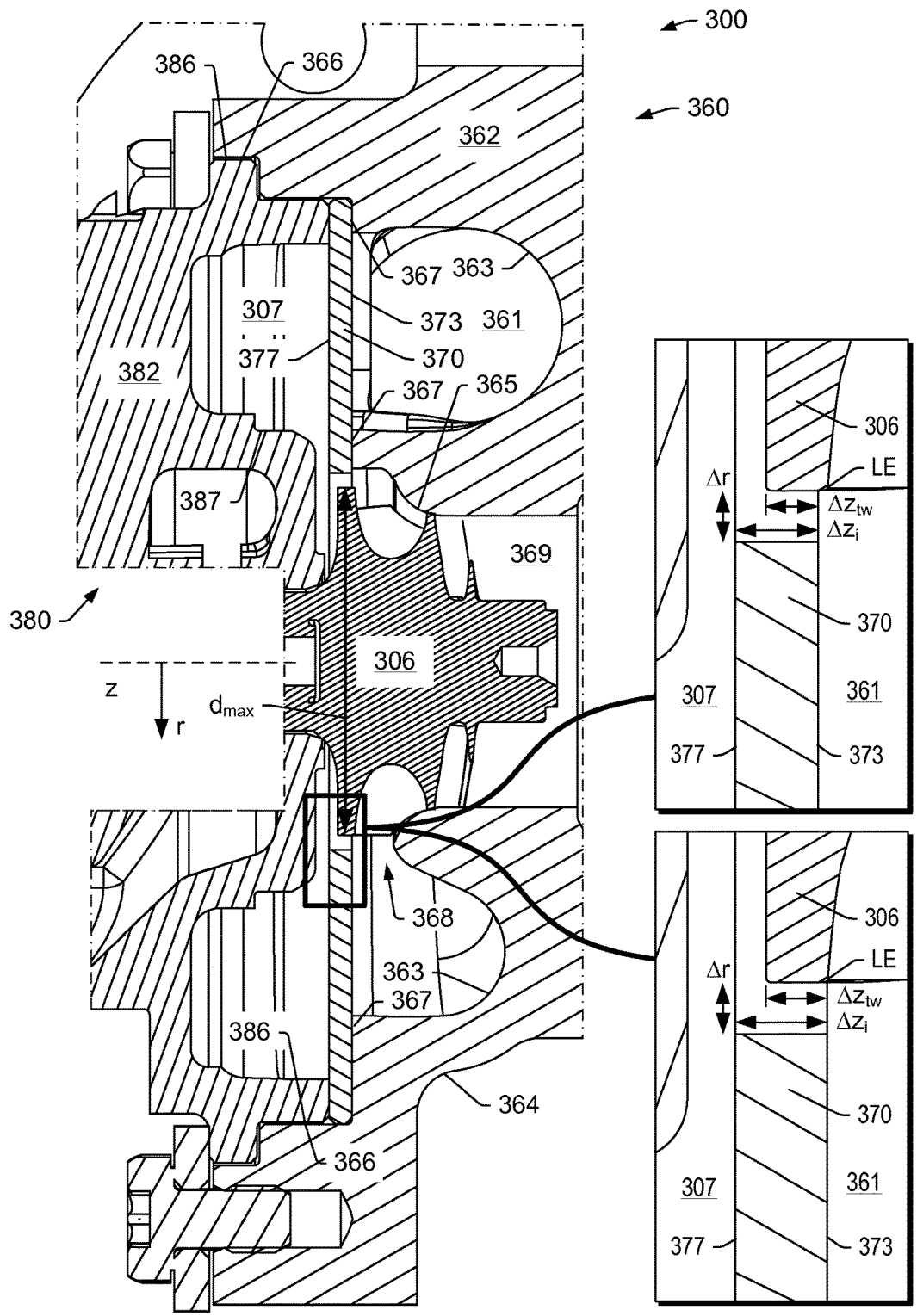
FIG. 3 is a cross-sectional view of an example of an assembly that includes a turbine housing and an insert and two enlarged views of examples of inserts.

FIG. 3 shows a cross-sectional view of an example of a portion of an assembly 300 that includes a portion of an example of a turbine assembly 360 and a portion of an example of a center assembly 380. In FIG. 3, the assembly 300 also includes an example of an insert 370 that is disposed at least in part between the turbine assembly 360 and the center assembly 380. As an example, the insert 370 may be part of the turbine assembly 360 or the insert 370 may be part of the center assembly 380.

As shown in FIG. 3, the turbine assembly 360 includes a volute 361 (e.g., a scroll that spirals with diminishing cross-sectional flow area for exhaust gas) that is defined in part by a turbine housing 362, particularly, a surface 363 of the turbine housing 362, and in part by the insert 370, particularly, a surface 373 of the insert 370.

As an example, a turbine housing that includes a volute may be a two-piece turbine housing. For example, consider a turbine housing that includes the turbine housing 362 and the insert 370 where, for example, the turbine housing 362 and the insert 370 may be made as separate pieces. In such an example, the turbine housing 362 may be made from a first material and the insert 370 may be made from a second, optionally different material. As an example, the turbine housing 362 may be made via a first process and the insert 370 may be made via a second, optionally different process. As an example, the turbine housing 362 may be made via casting (e.g., sand casting, etc.) and the insert 370 may be made via stamping material (e.g., stamping stock material, etc.).

As an example, the insert 370 may optionally be treated one or more surfaces, for example, to diminish resistance to flow of exhaust gas, to diminish corrosions from exposure to exhaust gas, to diminish heat transfer, etc. As an example, one or more of surfaces of the insert 370 may be nitrided. As an example, one or more surfaces of the insert 370 may be polished (e.g., to a mirror or near mirror finish that is highly reflected). As an example, one or more surfaces of the insert 370 may be treated to alter thermal conductivity. For example, consider deposition of a ceramic material that may act to diminish transfer of heat.

As an example, the turbine housing 362 may be formed, for example, via a casting process. In such an example, sand or other material may be used to define the metes and bounds of the surface 363. Further, compact sand may be used to define the metes and bounds of a surface 364 of the turbine housing 362. Yet further, the surface 364 can include a mating portion 366, for example, to operatively couple the turbine housing 362 to the center assembly 380 with the insert 370 disposed at least in part between the turbine housing 362 and the center assembly 380.

As shown in FIG. 3, the turbine housing 362 includes a shroud surface 365, an insert mating surface 367, a throat 368 that is a fluid passage for exhaust gas to pass from the volute 361 to a turbine wheel space defined in part by the shroud surface 365, and an outlet passage 369 that extends to an exhaust gas opening of the turbine housing 362. Various features of the turbine housing 362 may be formed via casting and optionally finished via machining a unitary cast piece as removed from a mold. For example, the mating portion 366 may be finished via machining to achieve an appropriate fit with the center assembly 380 and/or the insert mating surface 367 may be finished via machining to achieve an appropriate fit with the insert 370.

As to the center assembly 380, FIG. 3 shows an example of a center housing 382 that is operatively coupled to the turbine housing 362 in a manner that acts to locate the insert 370 therebetween. For example, one or more bolts may be used to couple the turbine housing 362 to the center housing 382 where force applied via the one or more bolts may act to clamp the insert 370 and thereby fixedly locate the insert 370, which defines, in part, the volute 361.

As shown, the center housing 382 includes a mating portion 386 that can contact the mating portion 366 of the turbine housing 362. Specifically, the mating portion 386 of the center housing 382 includes a male boss or extension that may be cylindrical in shape and received in part by a cylindrical female opening formed by the mating portion 366 of the turbine housing 362. In the example of FIG. 3, the insert 370 may be formed as an annular plate that is received in the female opening formed by the mating portion 366 of the turbine housing 362 and that is contacted by at least a portion of the mating portion 386 of the center housing 382.

As an example, the mating portion 386 of the center housing 382 may include an axial face and the insert mating surface 367 of the turbine housing 362 may include an axial face where the surface 373 of the insert 370 contacts the axial face of the insert mating surface 367 (e.g., proximate to an outer circumference of the insert 370) and contacts the axial face of the insert mating surface 367 (e.g., proximate to an inner circumference of the insert 370) and where the surface 377 of the insert 370 contacts the axial face of the mating portion 386 of the center housing 382. In such an example, the insert 370 may be axially located by at least one surface of the turbine housing 362 and at least one surface of the center housing 382.

When mated, the center housing 382 and the insert 370 define a chamber 307. As shown, the chamber 307 is defined by the surface 377 of the insert 370 and a surface 387 of the center housing 382.

As an example, the insert 370 may act in part as a heat shield. For example, the insert 370 may be manufactured from a material that acts to diminish transfer of heat from hot exhaust gas flowing in the volute 361 to the center housing 382. In such an approach, the chamber 307 and the insert 370 may diminish heating of lubricant that flows in the center housing 382 and to, for example, one or more bearings disposed within a bore of the center housing 382.

As mentioned, the insert 370 may be clamped between the turbine housing 362 and the center housing 382 at or near an outer circumference of the insert 370. In such a manner, where heat is transferred via contact between the insert 370 and the center housing 382, the region of contact may be at a distance from a bore of the center housing 382 in which one or more bearings (e.g., bearing assemblies, etc.) are located. For example, as shown in the example of FIG. 3, the mating portion 386 of the center housing 382 is formed as a cylindrical wall where the chamber 307 is formed as an annular space that may act to diminish heat transfer to a bearing boss portion of the center housing 382. The shape, optionally being substantially a cylindrical wall, can provide for heat transfer area and mass that can distribute heat energy, which may radiate outwardly from the center housing 382 and/or the turbine housing 362.

As to a method of assembly, a center housing rotating assembly (CHRA) may be pieced together followed by fitting the turbine housing 362 to the CHRA with the insert 370 disposed therebetween to form the chamber 307 (e.g., as formed by the surface 377 and the surface 387.

FIG. 3 also shows a turbine wheel 306 disposed at least in part in a turbine wheel space defined at least in part by the turbine housing 362. The turbine wheel 306 includes blades where contours of the blades form a clearance with the shroud surface 365 of the turbine housing 362. Again, during operation, exhaust gas flows into the volute 361 (e.g., via an inlet to the turbine housing 362) then via the throat 368 (e.g., as defined in part by the surface 373 of the insert 370) to the turbine wheel space such that the turbine wheel 306 can rotate and extract energy from the exhaust gas. Exhaust gas can then flow at least in part axially in the outlet passage 369 and, for example, onto an exhaust gas conduit or conduits, which may include, for example, one or more treatment units (e.g., catalytic converters, noise mufflers, etc.). As an example, a reduction in mass of a turbine housing may act to reduce thermal inertia, which may help, for example, to reduce heat flow during soak back conditions, increase catalytic light-off (e.g., flow of heat energy to one or more treatment units), etc.

FIG. 3 also shows two enlarged views of examples of a portion of the assembly 300 that includes a portion of the turbine wheel 306 and a portion of the insert 370. As shown, the turbine wheel 306 can include an outer edge that spans an axial distance $\Delta z_{tw}$ and the insert 370 can include an inner edge that spans an axial distance $\Delta z_i$. In the example of FIG. 3, axial overlap exists between the outer edge of the turbine wheel 306 and the inner edge of the insert 370. Thus, the insert 370 defines in part an opening through which the turbine wheel 306 may pass, for example, during assembly provided with a CHRA. As shown in FIG. 3, the outer edge of the turbine wheel 306 can be the maximum diameter $d_{max}$ of the turbine wheel 306. As an example, a clearance $\Delta r$ formed between the inner edge of the insert 370 and the outer edge of the turbine wheel 306 may be selected based on one or more criteria. As an example, the clearance $\Delta r$ may be defined to minimize flow of exhaust gas to the chamber 307 while not interfering with fluid dynamics of the turbine wheel 306 while rotating. As an example, the clearance $\Delta r$ may be defined based at least in part on one or more thermal expansion coefficients, for example, at least for the insert 370 and optionally for the turbine wheel 306.

As an example, a surface of an insert that defines in part a volute may be at an axial position that is less than an axial position of a lower edge of a blade of a turbine wheel and, for example, optionally at an axial position that is greater than an axial position of a lower edge of an outermost edge of the turbine wheel. For example, in the upper enlarged view of FIG. 3, the lower edge (LE) of a blade of the turbine wheel 306 is indicated and is at an axial position in a direction away from the center housing 362 that is greater than an axial position of the surface 373 of the insert 370 at its inner edge.

As an example, a surface of an insert that defines in part a volute may be at an axial position that is equal to or greater than an axial position of a lower edge of a blade of a turbine wheel and, for example, optionally at an axial position that is greater than an axial position of a lower edge of an outermost edge of the turbine wheel. For example, in the lower enlarged view of FIG. 3, the lower edge (LE) of a blade of the turbine wheel 306 is indicated and is at an axial position in a direction away from the center housing 362 that is approximately equal to an axial position of the surface 373 of the insert 370 at its inner edge.

As an example, the inner edge of the insert 370 may include a contour, a rounded edge, rounded edges, etc., or, for example, the inner edge of the insert 370 may be relatively straight and form corners of approximately 90 degrees with the surface 373 and the surface 377.

As an example, the inner edge of the insert 370 may be defined at least in part by a radius or a diameter, for example, to form the throat 368. For example, the throat 368 may be defined by the surface 373 at the inner edge of the insert 370 and the surface 363 at a point that is axially outward from the inner edge of the insert 370.

As an example, an insert may be positioned and/or shaped to define a throat dimension. As an example, a set of inserts may be provided and a particular insert selected to define a desired throat dimension (e.g., axial throat height). In such an example, the throat dimension may be selected to enhance efficiency of a turbocharger (e.g., particularly in "small" turbochargers for passenger vehicles, etc.). As an example, an insert may help to maintain a desired throat dimension when manufacturing turbochargers.

As an example, an insert may be part of a variable geometry mechanism. For example, an insert may be adjustable axially to shape an exit of a volute to a turbine wheel space. As an example, consider the insert 370 of FIG. 3 as including an adjustable portion (e.g., an adjustable annular portion) that defines a throat from the volute 361 to the turbine wheel 306 in a turbine wheel space. In such an example, the throat area may be controlled, for example, to achieve a desired performance characteristics (e.g., optionally akin to vanes of a variable geometry turbine). As an example, consider a method that may be described via the two enlarged views of FIG. 3. In such an example, an actuator may at least in part axially adjust the surface 373 with respect to an axial position of the turbine wheel 306. In such an example, the insert 370 may be shifted axially and/or may include an axially expandable portion that can increase thickness to thereby shift the surface 373 axially.

As an example, an insert may be manufactured from a material that is less dense than that of a cast turbine housing. In such an example, an assembly that includes an insert may reduce mass of a turbocharger when compared to a turbocharger that includes a unitary cast turbine housing such as the unitary cast turbine housing 262 of FIG. 2. As an example, a reduction in mass may act to conserve heat energy in exhaust gas that may be beneficial for one or more treatment processes (e.g., catalytic converter, etc.) that can, for example, reduce emissions. As an example, an insert approach may act to decrease mass by about 100 grams or more when compared to an approach that uses a unitary cast turbine housing (e.g., without an insert).

As an example, the turbine housing 362 of FIG. 3 when compared to the unitary cast turbine housing 262 of FIG. 2 may provide for increased volute surface, for example, to machine one or more surfaces associated with a throat, etc. In such an example, throat dimension(s) precision may be improved for turbochargers manufactured in an assembly line, etc. (e.g., to help with unit to unit performance consistency). As an example, in the turbine housing 362, the surface 363 may be at least in part machined, polished, dimensioned, etc. prior to assembly with the insert 370. For example, a smoother finish as to the surface 363 may act to increase efficiency of a turbocharger. As an example, upon disassembly, the insert 370 may be removed to inspect condition of the surface 363.

As an example, shape, thickness, stiffness, etc. of an insert may be selected, for example, to diminish vibration. For example, an insert that is too thin may be impacted by fluid dynamics during operation and may exhibit one or more modes of vibration. As an example, for an insert such as the insert 370 may be supported at or near its outer periphery and may be of a thickness, stiffness, etc. that acts to avoid at least some detrimental vibrational modes. As an example, where an insert includes support at multiple locations (e.g., at an outer periphery and at an inner periphery, etc.), a thinner insert may optionally be utilized as such support may act to avoid at least some detrimental vibrational modes. As an example, an insert may be loaded via contact at multiple points at different radii where such loading may act to diminish risk of one or more vibrational modes of the insert.

As an example, an insert may be supported in a manner that acts to diminish risk of undesirable vibrational modes of the insert due to fluid dynamics during operation (e.g., associated with exhaust gas moved by a turbine wheel and flowing in a volute and optionally flowing or otherwise pressurized in a chamber or a chamber where the insert defines in part the volute and defines in part the chamber. As an example, a chamber may be to one side of an insert and a volute directly to another, opposing side of the insert. For example, in moving axially across an insert, one may move from a chamber across the insert to a volute. In such an example, a radial dimension of the chamber corresponds to a radial dimension of the volute.

As an example, exhaust gas may flow from the volute 361 and via a clearance between the turbine wheel 306 and the insert 370 and to the chamber 307. In such an example, bulk flow of exhaust gas may be in a direction radially inwardly toward the clearance, axially through the clearance and at least in part radially outwardly away from the clearance.

As shown in the example of FIG. 3, the insert 370 defines the lowermost surface of the volute 361 and extends radially outwardly beyond the maximum radius of the volute 361. In such an example, the surface 363 of the turbine housing 362 does not define a surface of a portion of the turbine housing 362 that participates in heat transfer in an axial direction toward the chamber 307. In such an example, the insert 370, as defining in part the volute 361, can be a component that controls heat transfer in an axial direction toward the chamber 307. As mentioned, the insert 370 may be constructed of a material with desirable heat transfer properties. In such an example, the heat transfer properties of the material of the insert 370 may be asymmetric. For example, heat transfer in a radial direction may differ from heat transfer in an axial direction. In such an approach, heat energy may be preferentially directed radially outwardly, for example, away from a bore of the center housing 382, in which one or more lubricant lubricated bearings may be disposed.

Figure 4:
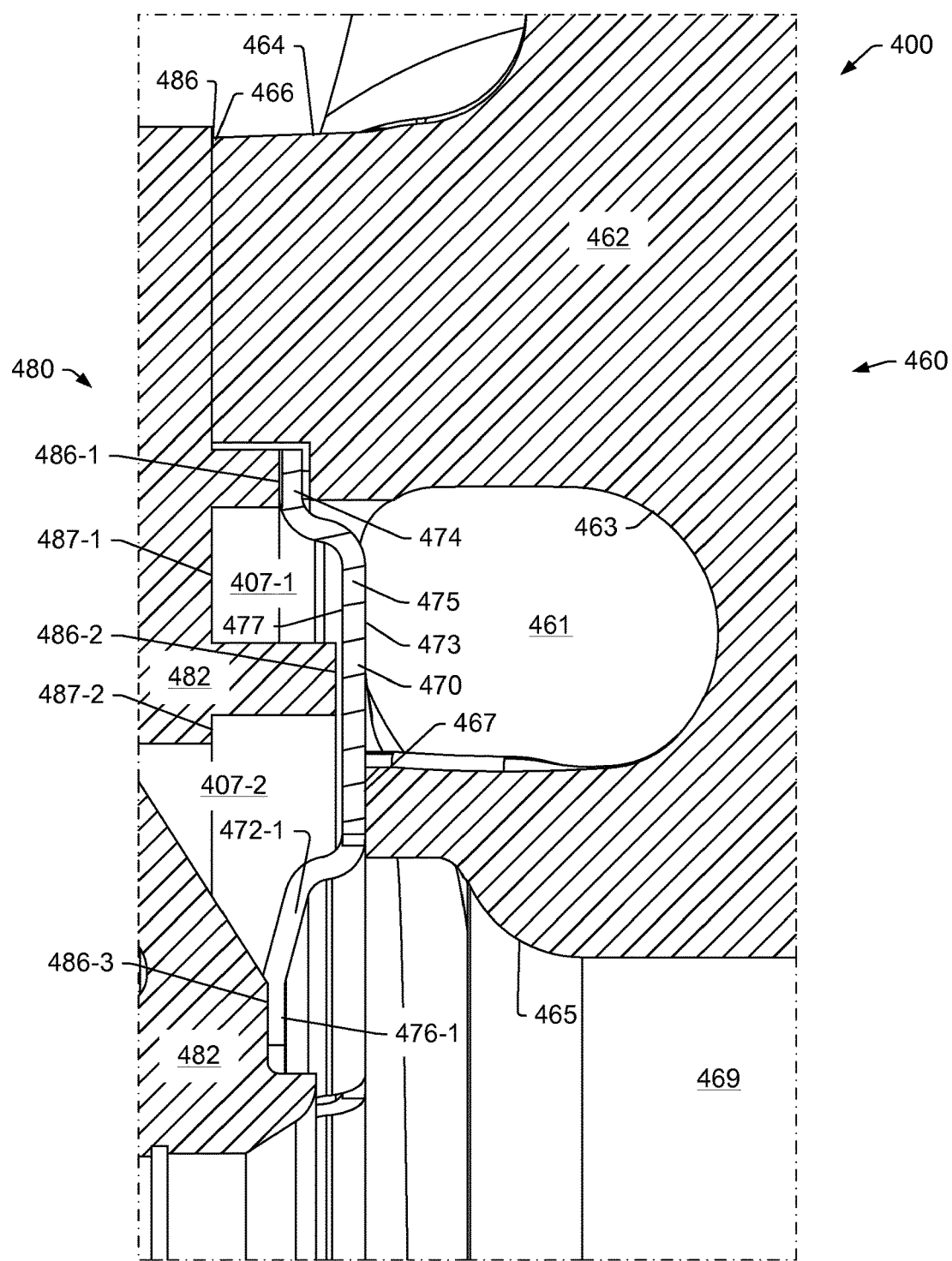
FIG. 4 is a cross-sectional view of an example of an assembly that includes a turbine housing and an insert.

FIG. 4 shows a cross-sectional view of an example of a portion of an assembly 400 that includes a portion of an example of a turbine assembly 460 and a portion of an example of a center assembly 480. In FIG. 4, the assembly 400 also includes an example of an insert 470 that is disposed at least in part between the turbine assembly 460 and the center assembly 480. As an example, the insert 470 may be part of the turbine assembly 460 or the insert 470 may be part of the center assembly 480. As an example, material thickness of the insert 470 may optionally be thinner than material thickness of the insert 370.

As shown in FIG. 4, the turbine assembly 460 includes a volute 461 (e.g., a scroll that spirals with diminishing cross-sectional flow area for exhaust gas) that is defined in part by a turbine housing 462, particularly, a surface 463 of the turbine housing 462, and in part by the insert 470, particularly, a surface 473 of the insert 470.

As an example, a turbine housing that includes a volute may be a two-piece turbine housing. For example, consider a turbine housing that includes the turbine housing 462 and the insert 470 where, for example, the turbine housing 462 and the insert 470 may be made as separate pieces. In such an example, the turbine housing 462 may be made from a first material and the insert 470 may be made from a second, optionally different material. As an example, the turbine housing 462 may be made via a first process and the insert 470 may be made via a second, optionally different process. As an example, the turbine housing 462 may be made via casting (e.g., sand casting, etc.) and the insert 470 may be made via stamping material (e.g., stamping stock material, etc.).

As an example, the insert 470 may optionally be treated one or more surfaces, for example, to diminish resistance to flow of exhaust gas, to diminish corrosions from exposure to exhaust gas, to diminish heat transfer, etc. As an example, one or more of surfaces of the insert 470 may be nitrided. As an example, one or more surfaces of the insert 470 may be polished (e.g., to a mirror or near mirror finish that is highly reflected). As an example, one or more surfaces of the insert 470 may be treated to alter thermal conductivity. For example, consider deposition of a ceramic material that may act to diminish transfer of heat.

As an example, the turbine housing 462 may be formed, for example, via a casting process. In such an example, sand or other material may be used to define the metes and bounds of the surface 463. Further, compact sand may be used to define the metes and bounds of a surface 464 of the turbine housing 462. Yet further, the surface 464 can include a mating portion 466, for example, to operatively couple the turbine housing 462 to the center assembly 480 with the insert 470 disposed at least in part between the turbine housing 462 and the center assembly 480.

As shown in FIG. 4, the turbine housing 462 includes a shroud surface 465, an insert mating surface 467, and an outlet passage 469 that extends to an exhaust gas opening of the turbine housing 462. Various features of the turbine housing 462 may be formed via casting and optionally finished via machining a unitary cast piece as removed from a mold. For example, the mating portion 466 may be finished via machining to achieve an appropriate fit with the center assembly 480.

As to the center assembly 480, FIG. 4 shows an example of a center housing 482 that is operatively coupled to the turbine housing 462 in a manner that acts to locate the insert 470 therebetween. For example, one or more bolts may be used to couple the turbine housing 462 to the center housing 482 where force applied via the one or more bolts may act to clamp the insert 470 and thereby fixedly locate the insert 470, which defines, in part, the volute 461.

In the example of FIG. 4, the insert 470 includes a surface 477 that is on one side of the insert 470 that is opposite to another side of the insert 470 that includes the surface 473. In the example of FIG. 4, the insert 470 includes an outer portion 474 that steps up to an intermediate portion 475 that steps down via a leg 472-1 to an inner portion 476-1, which may be one of a plurality of inner portions that extends from one of a plurality of respective legs (see, e.g., the insert 970 of FIG. 9).

As shown in FIG. 4, the center housing 482 includes a mating portion 486 where at least a portion of the mating portion 486 can contact the mating portion 466 of the turbine housing 462 (e.g., optionally via a sealant, a seal element, etc.). In the example of FIG. 4, the center housing 482 includes mating portion features 486-1, 486-2 and 486-3. As shown the feature 486-1 can mate with the outer portion 474 of the insert 470, the feature 486-2 can mate with and/or form a clearance with the intermediate portion 475 of the insert 470 and the feature 486-3 can mate with the inner portion 476-1 of the insert 470 (e.g., an optionally one or more other inner portions of the insert 470).

As an example, the insert 470 may be supported at least in part via a feature of a center housing at or proximate to the outer portion 474 of the insert 470 (e.g., along the surface 477) and be supported at least in part via a feature of a center housing at or proximate to the inner portion 476-1 of the insert 470 (e.g., along the surface 477). In such an example, the insert 470 may contact a portion of a turbine housing, for example, along the intermediate portion 475 (e.g., along the surface 473). As an example, a turbine housing and a center housing may be operatively coupled in a manner that applies force to an insert where at least a portion of the insert contacts the turbine housing and where at least a portion of the insert contacts the center housing. In such an example, the insert may be clamped between the center housing and the turbine housing where a surface of the insert defines at least in part a volute. In such an example, the insert may also define in part at least one chamber disposed between the center housing and the turbine housing.

In the example of FIG. 4, the insert 470 defines in part one or more chambers 407-1 and 407-2, for example, together with the center housing 482. For example, the center housing 482 can include a surface 487-1 and a surface 487-2 that define the chambers 407-1 and 407-2 with respect to the surface 477 of the insert 470. In such an example, a clearance may exist between the feature 486-2 of the center housing 482 and the surface 477 of the insert 470. As an example, clearances (e.g., gaps or channels) may exist between pairs of legs of the insert 470. For example, the leg 472-1 may define a gap with respect to one or more other legs (e.g., 472-2 and 472-N). In such an example, exhaust gas may flow in the gap and into the chamber 407-2. Where a clearance exists between the feature 486-2 and the surface 477 of the insert 470, exhaust gas may flow via the clearance to the chamber 407-1. In such a manner, the chambers 407-1 and 407-2 may be in fluid communication with exhaust gas, which may, for example, act to balance pressure as well as act to control heat transfer in a desired manner (e.g., via chamber size, gap and/or clearance size, etc.).

As an example, clamping forces may be applied to the insert 470 such that the insert 470 is loaded. For example, the surface 473 of the insert 470 may contact the insert mating surface 467 of the turbine housing 462 and surface 477 of the insert 470 may contact the feature 486-1 (e.g., an axial face) and the feature 486-3 (e.g., an axial face). In such an example, upon operatively coupling the turbine housing 462 to the center housing 482, the insert 470 may be loaded by these three contacts (e.g., a contact at or near an outer periphery of the insert 470, a contact at or near an inner periphery of the insert 470 and a contact intermediate the outer periphery and the inner periphery of the insert 470). As an example, a contact may be along the outer portion 474 of the insert 470, a contact may be along the inner portion 476-1 (e.g., or inner portions) of the insert 470 and a contact may be along the intermediate portion 475 of the insert 470. Such contacts may act to load the insert 470, which may, for example, help to seal the surface 473 against the insert mating surface 467 of the turbine housing 462 (e.g., as to a portion of the volute 461).

In the example of FIG. 4, the mating portion 486 of the center housing 482 includes a male boss or extension that may be cylindrical in shape and received in part by a cylindrical female opening formed by the mating portion 466 of the turbine housing 462.

As to a method of assembly, a center housing rotating assembly (CHRA) may be pieced together followed by fitting the turbine housing 462 to the CHRA with the insert 470 disposed therebetween to form the chambers 407-1 and 407-2.

Figure 5:
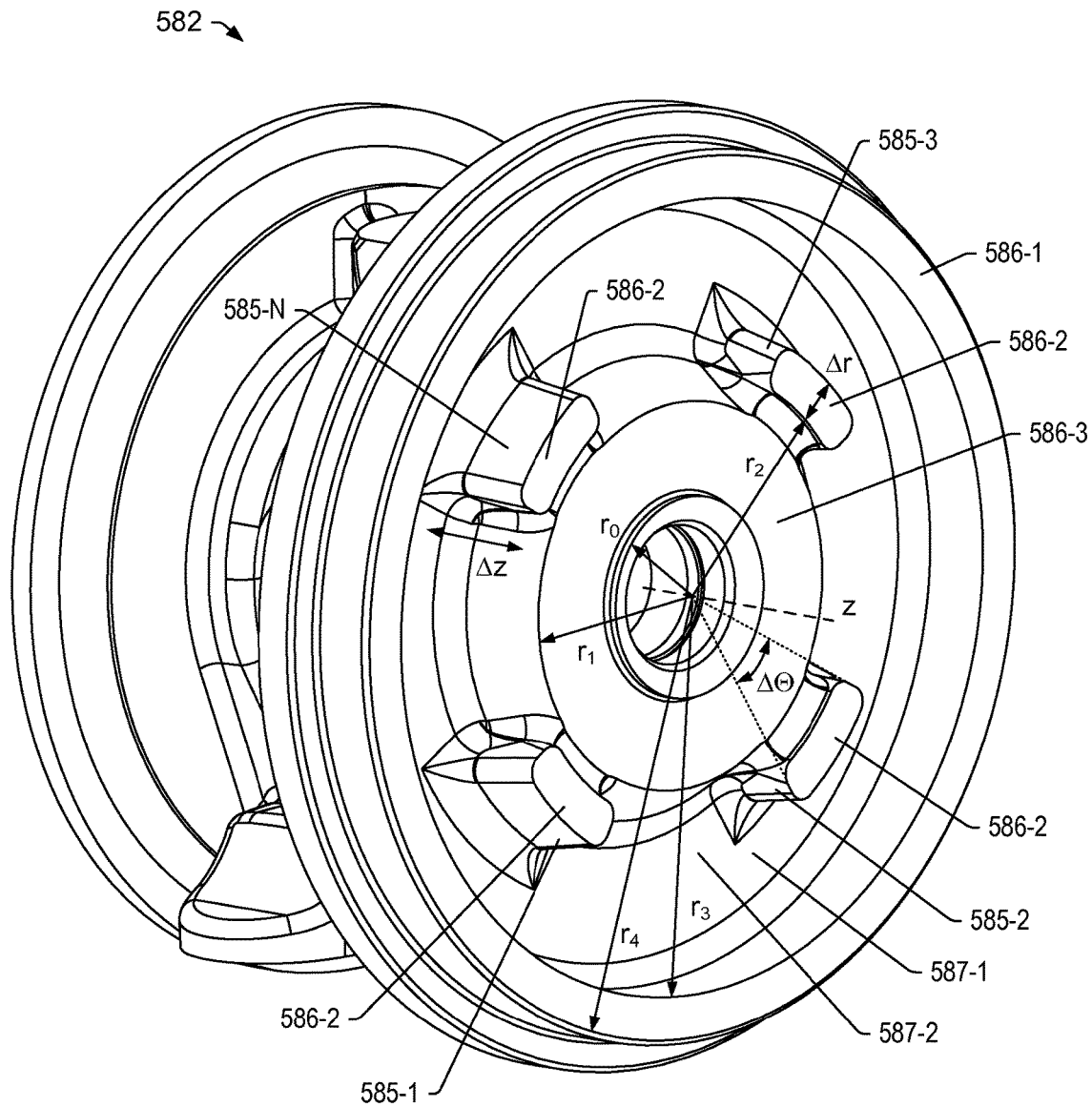
FIG. 5 is a perspective view of an example of a center housing.

FIG. 5 shows a perspective view of an example of a center housing 582 that includes a compressor side and a turbine side. On the turbine side, the center housing 582 includes an outer annular surface 586-1, a plurality of annular segment surfaces 586-2 and an inner annular surface 586-3. The center housing 582 also includes a surface 587-1 and a surface 587-2 that is segmented, as disposed between pairs of extensions of extensions 585-1, 585-2, 585-3 and 585-N that include the plurality of annular segment surfaces 586-2 (e.g., pad surfaces). In such an example, an insert may be positioned to contact the turbine side of the center housing 582 to form, for example, one or more chambers with respect to the surfaces 587-1 and 587-2. As an example, the surfaces 586-1 and 586-2 may contact an insert and receive force applied to the insert via a turbine housing that is operatively coupled to the center housing 582.

In the example of FIG. 5, the extensions 585-1, 585-2, 585-3 and 585-N may be shaped and sized and of a number that acts to control heat transfer from a turbine housing to the center housing 582. For example, a center housing may include about three to about six extensions where each extension includes a surface that may be a support surface that can contact an insert, for example, as loaded between a center housing and a turbine housing. With reference to the example of FIG. 4, the feature 486-2 may correspond to a surface such as one of the annular segment surfaces 586-2 of FIG. 5. As an example, the insert 470 of FIG. 4 may be loaded and/or shaped such that the surface 477 contacts the feature 486-2.

In the example of FIG. 5, various dimensions are shown with respect to a cylindrical coordinate system (r, z and Θ). For example, radial dimensions are shown as $r_0$, $r_1$, $r_2$, $r_3$ and $r_4$ that correspond to a bore lip outer radius, an extension inner radius, an annular ring inner radius and an annular ring outer radius, respectively. Also shown in FIG. 5 is a radial span Δr that corresponds to the extension 585-3 and an azimuthal span ΔΘ that corresponds to the extension 585-2. For example, such dimensions may correspond to individual annular segment surfaces 586-2 (e.g., pad surfaces). As an example, an extension may be defined by an axial span. For example, the extension 585-N is shown as being defined in part by an axial span Δz (e.g., a distance from the surface 587-1 to the surface 586-2 of the extension 585-N). As an example, thermal data may be acquired and used to select dimensions of one or more features of a center housing, for example, for reduced heat transfer from a turbine assembly while providing adequate support to the turbine assembly.

Figure 6:
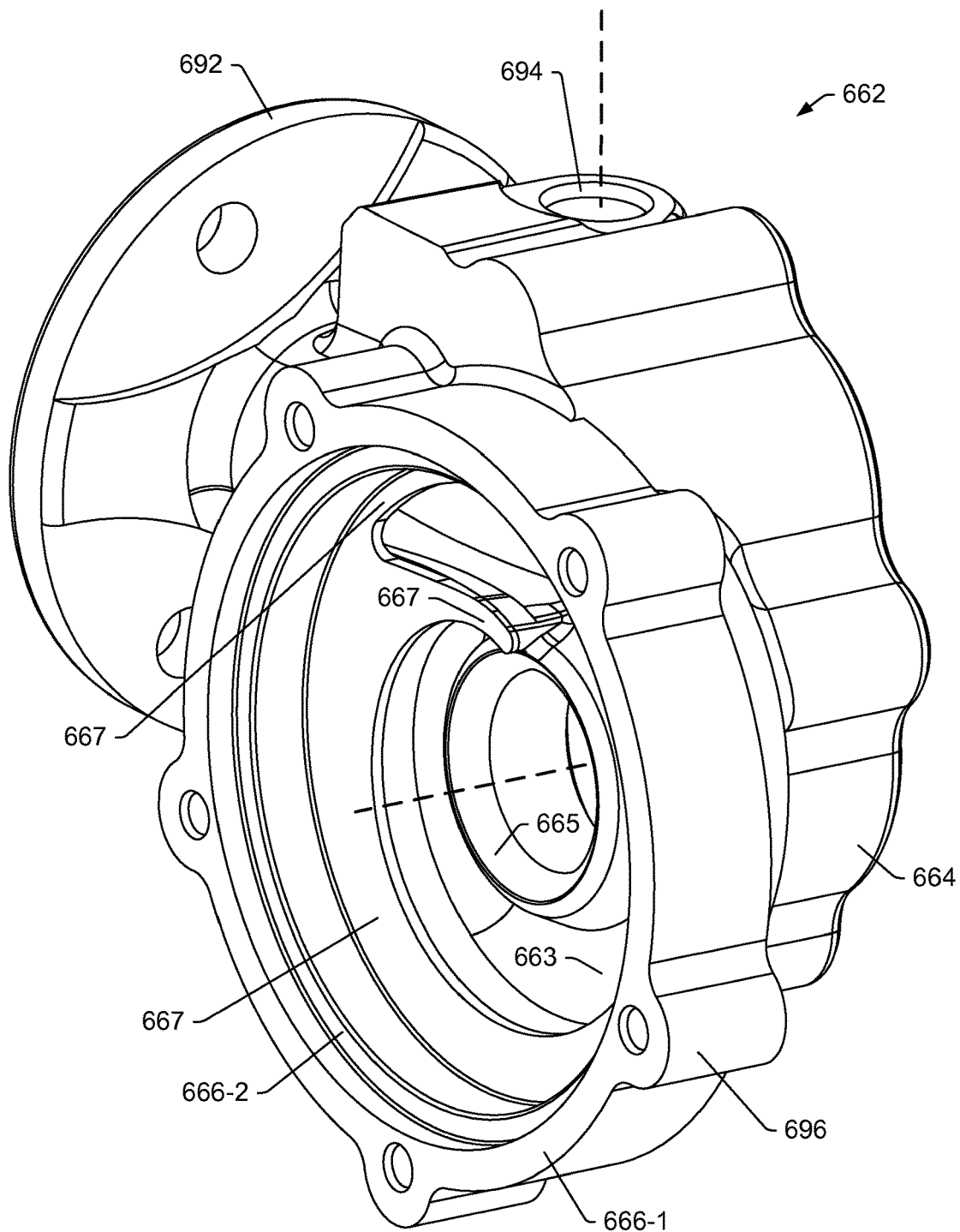
FIG. 6 shows a perspective of an example of a turbine housing.

FIG. 6 shows a perspective view of an example of a turbine housing 662. In the example of FIG. 6, the turbine housing 662 includes a surface 663 that defines in part a volute (e.g., with respect to an insert), a surface 664 (e.g., an outer surface), a shroud surface 665, a mating surface 666-1, a recessed mating surface 666-2, an insert mating surface 667, an exhaust gas inlet flange 692, a wastegate shaft bore 694, and a plurality of coupling bosses 696 (e.g., with bores to receive bolt shafts, etc.).

In the example of FIG. 6, the insert mating surface 667 can include an annular surface portion that can seat an insert. In such an example, the annular surface portion can include a radius that exceeds a maximum radius of the volute (see, e.g., FIG. 3) and, for example, the annular surface portion can extend to a portion that extends radially inwardly, for example, to form an end of a volute.

Figure 7:
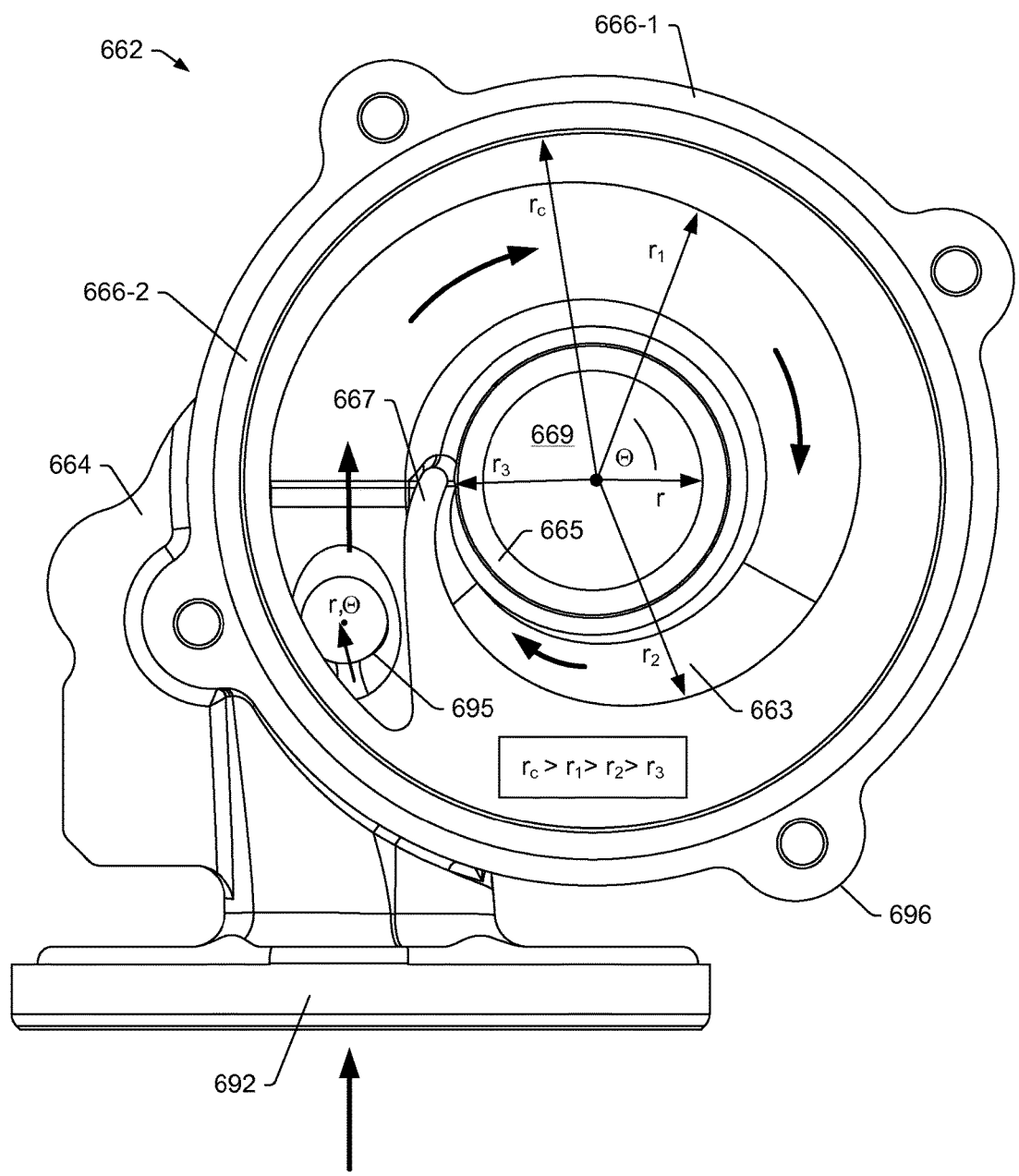
FIG. 7 shows a plan view of an example of a turbine housing.

FIG. 7 shows a plan view of the turbine housing 662 of FIG. 6. In FIG. 7, various arrows indicate general directions of flow of exhaust gas, which may optionally pass through a wastegate opening 695, which may be controlled (e.g., opened, closed, etc.) via a wastegate valve assembly that includes a shaft disposed at least in part in the wastegate shaft bore 694 (see FIG. 6). FIG. 7 also shows an outlet passage 669. In the example of FIG. 7, various features, surfaces, edges, contours, etc., may be defined with respect to a cylindrical coordinate system (e.g., r, z, and Θ). For example, consider various radii labeled $r_c$, $r_1$, $r_2$ and $r_3$ where $r_c > r_3 > r_2 > r_1$. In such an example, $r_c$ may be relatively constant while the radii $r_1$, $r_2$ and $r_3$ may decrease in a clockwise direction in the view of FIG. 7 (e.g., in an intended direction of flow of exhaust gas) as they define a surface of a volute, for example, where $r_3$ may be a minimal radius (e.g., of a tongue portion). As an example, the wastegate opening 695 may be defined by a radius and an angle, for example, referenced with respect to $r_3$.

In the plan view, during operation, exhaust gas can flow in a clockwise direction to rotate a turbine wheel in a clockwise direction. Where a wastegate valve is employed (e.g., operationally fitted to the turbine housing 662), a controller (e.g., actuator) may control flow of exhaust gas via the wastegate opening 695, which acts to divert an amount of exhaust gas from a path to the volute. For example, the insert mating surface 667 may act to seal the volute when contacted with an insert such that exhaust gas can exit via the wastegate opening 695 without passing through a throat to a turbine wheel space.

In the example of FIG. 7, the wastegate opening 695 is shown as being in an inlet section defined in part by a wall that extends axially inwardly from the mating surface 667. As an example, an assembly can include a valve with a plug that can close the wastegate opening 695 (e.g., the valve being in a closed state) and that can open the wastegate opening 695 (e.g., the valve being in an open state). In an open state of such a valve, at least a portion of exhaust gas can bypass a volute formed at least in part by the surface 663 of the turbine housing 662. Other locations for a wastegate opening or wastegate openings are possible. For example, a wastegate opening may be disposed with a flow axis that is at least in part radially directed.

Figure 8:
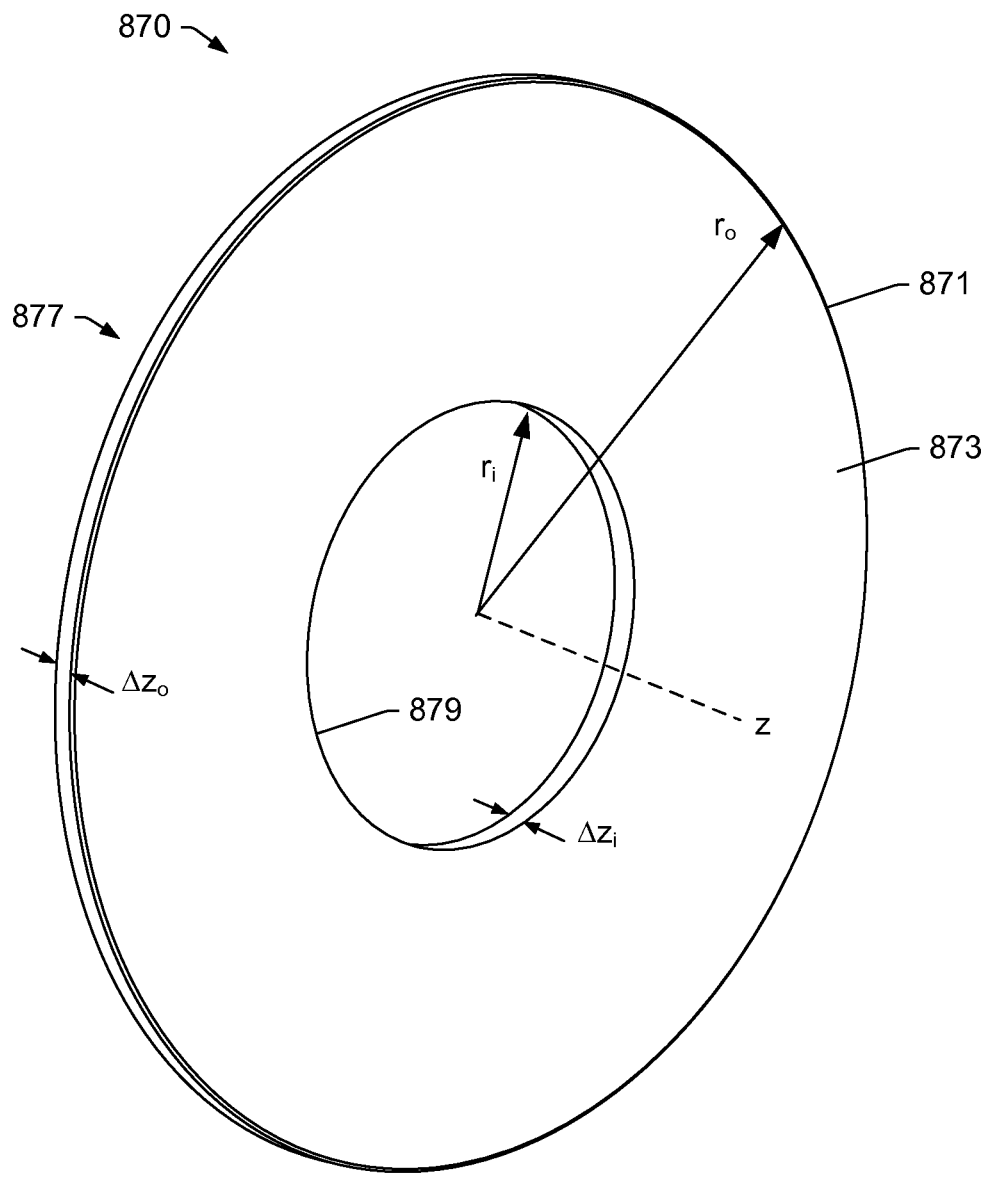
FIG. 8 shows a perspective view of an example of an insert.

FIG. 8 shows a perspective view of an example of an insert 870 that includes an outer periphery 871 (e.g., an outer edge), a surface 873, an opposing surface 877 and an inner periphery 879 (e.g., an inner edge). In such an example, the insert 870 may be planar. As an example, the insert 870 may be defined with respect to parameters such as a thickness (e.g., or thicknesses), inner radius (e.g., or inner diameter) and outer radius (e.g., or outer diameter).

In the example of FIG. 8, the insert 870 is shown with respect to an inner radius $r_i$, an outer radius $r_o$, an inner edge thickness $\Delta z_i$ and an outer edge thickness $\Delta z_o$. As an example, an insert may include a thickness profile where, for example, thickness differs for at least two radial positions. Such an approach may act to control one or more of loading, thermal effects, etc. As an example, an insert may be constructed from a material with properties that differ radially from axially. For example, a material may conduct heat more readily in a radial direction compared to an axial direction. As an example, a material may be a composite material, which may include oriented structures (e.g., fibers, inclusions, etc.) that can alter thermal properties. As an example, an insert may be manufactured by stamping material from stock. For example, consider stamping an insert from plate shaped stock.

Figure 9:
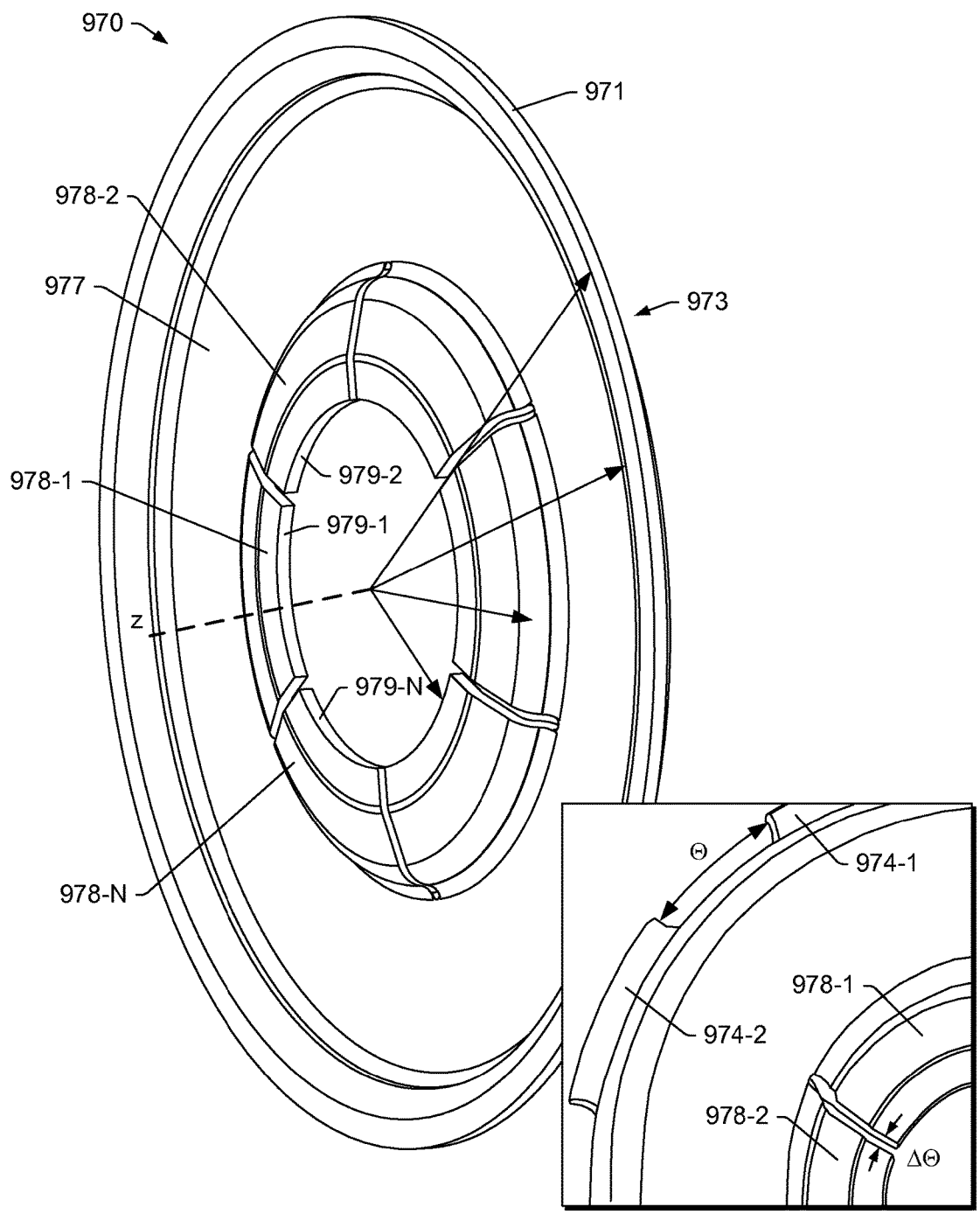
FIG. 9 shows a perspective view of an example of an insert and an enlarged perspective view of an example of a portion of an insert.

FIG. 9 shows a perspective view of an example of an insert 970 that includes an outer periphery 971 (e.g., an outer edge), a surface 973, an opposing surface 977, segments 978-1, 978-2, . . . , 978-N and an inner periphery 979-1, 979-2, . . . , 979-N (e.g., inner edges of the segments 978-1, 978-2, . . . , 978-N). In such an example, the insert 970 may be defined in part by an axial height (e.g., consider a z-axis in a cylindrical coordinate system). As an example, the insert 970 may be defined with respect to parameters such as thickness (e.g., or thicknesses), inner radius (e.g., or inner diameter) and outer radius (e.g., or outer diameter).

In the example of FIG. 9, the insert 970 may be resilient such that it may be compressed and loaded with a corresponding reduction in axial height. For example, the segments 978-1, 978-2, . . . , 978-N of the insert 970 may impart an amount of resiliency to the insert 970 where the segments 978-1, 978-2, . . . , 978-N may flex individually.

FIG. 9 also shows a view of the insert 970 as optionally including a segmented perimeter. For example, the insert 970 can include segments 974-1, 974-2, . . . , 974-N where such segments may be separated by a gap defined by an arc span $\Theta$. In such an example, heat transfer to and/or from the insert 970 to one or more other components may be reduced. As shown, the segments 978-1, 978-2, . . . , 978-N may be separated by a gap, for example, defined in part by an azimuthal distance $\Delta\Theta$. As an example, an assembly can include one or more thermal compensation features, which may include, for example, one or more of slots, segments, etc. (e.g., located at one or more regions of a housing, an insert, etc.

As an example, an insert may be a "floating" insert. As an example, an insert may be a clamped insert. As an example, an insert may be spring loaded, optionally with stack up or loosely held. As an example, an insert may itself be biased such that the insert carries a load. As an example, an insert may be installed in an assembly to have a preload (e.g., a particular amount of static force, etc.).

As an example, one or more heat transfer features may provide an amount of resiliency to an insert. For example, an insert may include inner segments and/or outer segments (e.g., with gaps therebetween). In such an example, individual segments (e.g., compared to a continuous annular region) may provide an amount of resiliency (e.g., to accept a preload, to bias one or more components, etc.). As an example, individual segments may reduce heat transfer and, for example, allow for thermal expansion (e.g., and contraction) while reducing distortion of one or more surfaces of an insert. As an example, individual segments may allow for expansion and/or contraction of an insert in a manner that reduces changes in compression and/or tension forces due to temperature changes (e.g., compared to an insert without such individual segments).

Figure 10:
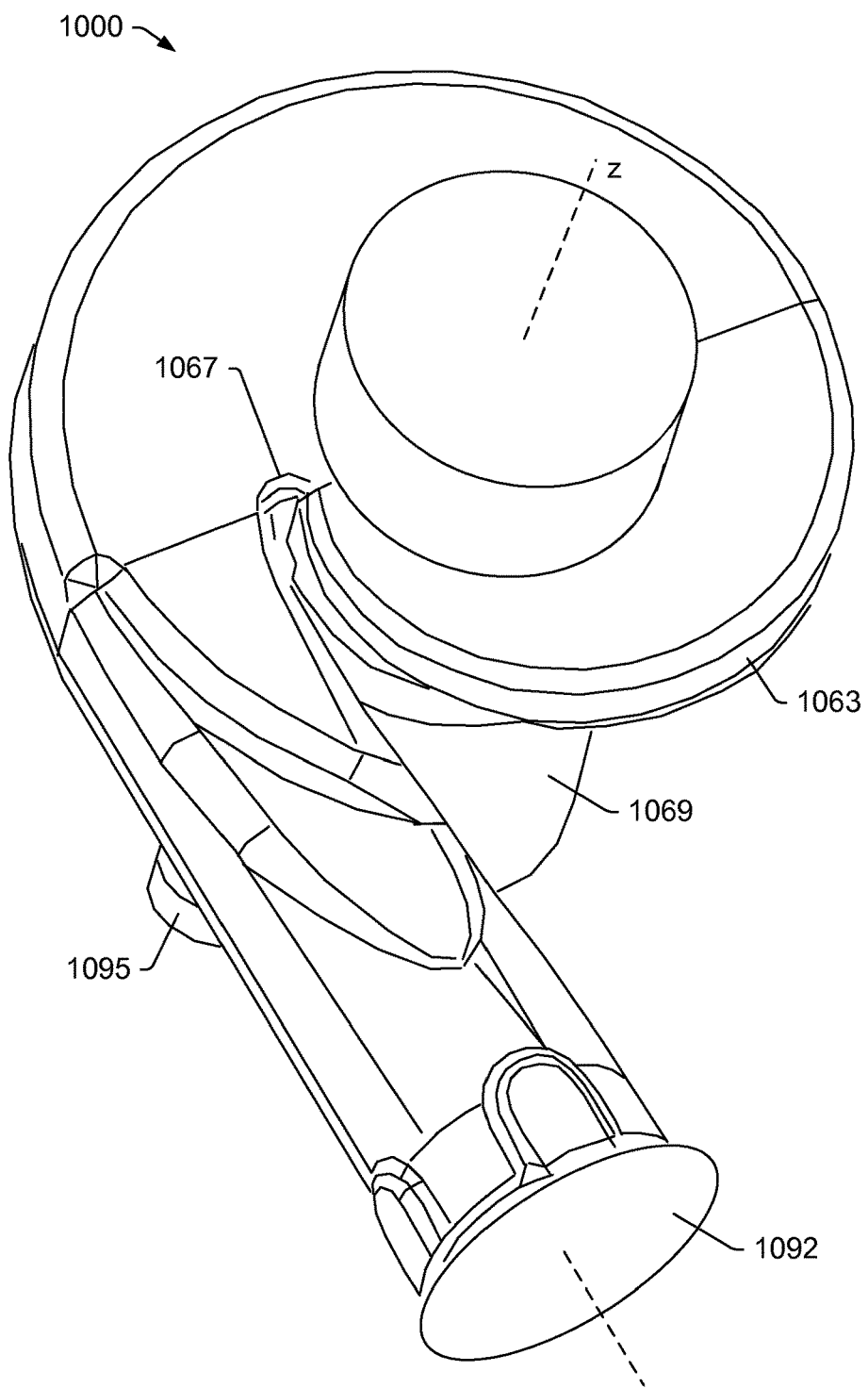
FIG. 10 shows a perspective view of an example of a core.

As mentioned, a turbine housing may be formed via use of a core (e.g., a single or a multi-piece core). FIG. 10 shows a perspective view of an example of a core 1000. In the example of FIG. 10, the core 1000 includes various features that are reciprocal to features imparted to a turbine housing that is formed using the core 1000. Such features include a volute surface feature 1063, an insert mating surface feature 1067, an outlet passage feature 1069, an exhaust gas inlet opening and passage feature 1092 and a wastegate shaft bore feature 1095.

As an example, a core may be formed of multiple pieces, for example, to allow for more complex shapes, a split at an entrance section, an angle of split, etc. For example, the core may be formed of a "stock" piece and a "selectable" piece that acts to customize the shape of at least one wall of a turbine housing that at least in part defines a volute. In such an example, the stock piece and a selected piece may be used together in a process that can form a turbine housing.

As an example, a process to form a turbine housing may include sand casting. In such an example, a relatively thin walled turbine housing may be formed that provides adequate strength with reduced heat retention. As to material of construction, consider, for example, one or more of high temp range austenitic cast irons, stainless steels, etc. As an example, an assembly may include a cast turbine housing and an insert where a volute of the assembly is defined at least in part by the cast turbine housing and at least in part by the insert.

Figure 11:
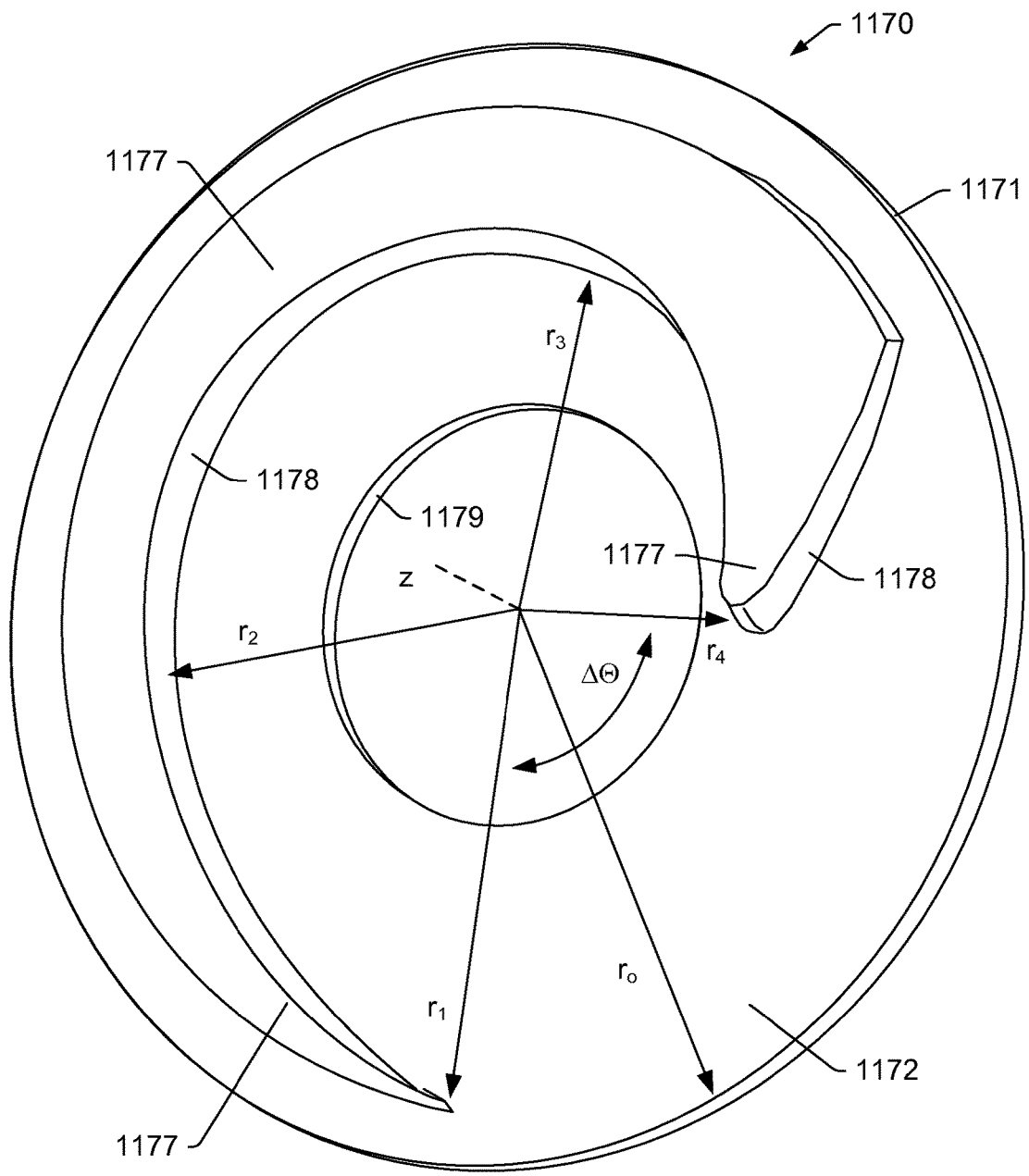
FIG. 11 shows a perspective view of an example of an insert.

FIG. 11 shows an example of an insert 1170 that includes an outer perimeter 1171 disposed at an outer radius, a substantially annular surface 1172, a raised mating surface 1177, a surface 1178 that extends between the substantially annular surface 1172 and the raised mating surface 1177, and an opening defined by an inner perimeter 1179 disposed at an inner radius. The raised mating surface 1177 and at least a portion of the surface 1178 can form, for example, at least a portion of volute. For example, such a volute may provide for flow of exhaust gas to a turbine wheel that extends axially at least in part between the substantially annular surface 1172 and the raised mating surface 1177. In such an example, the portion of the surface 1178 that faces radially in a direction toward the inner perimeter 1172 may be a volute wall that acts in conjunction with one or more other walls to contain the flow of exhaust gas, for example, to drive a turbine wheel.

Various radii are shown in FIG. 11, labeled $r_o$, $r_1$, $r_2$, $r_3$ and $r_4$ where $r_o > r_4 > r_3 > r_2 > r_1$. In such an example, $r_o$ may be relatively constant while the radii $r_1$, $r_2$, $r_3$ and $r_4$ may decrease in a clockwise direction in the view of FIG. 11 (e.g., in an intended direction of flow of exhaust gas) as they define a surface of a volute, for example, where $r_4$ may be a minimal radius (e.g., of a tongue portion). As an example, an azimuthal span may be defined between portions of a surface (see, e.g., the span $\Delta\Theta$). As an example, such an insert may be oriented with respect to a wastegate opening (e.g., consider the wastegate opening 695 of FIG. 6), which may be defined by a radius and an angle, for example, referenced with respect to $r_4$.

In the example of FIGS. 6 and 7, the mating surface 667 is shown as being, for example, part of the turbine housing 662. As shown in FIGS. 6, 7 and 11, the mating surface 667 or the raised mating surface 1177 can be positioned an axial distance away from another surface to define in part a volute. As an example, a portion of a volute forming wall may be a wall of a turbine housing and a portion of a volute forming wall may be a wall of an insert.

As an example, a wall that forms at least a portion of a volute may be, structurally, thermally flexible. In such an example, the wall (e.g., as part of a housing and/or as part of an insert) may provide for reduction of stress, reduction of high cycle fatigue (e.g., as to flow to a turbine wheel), and/or flow shaping for flow of exhaust gas to a turbine wheel (e.g., for performance optimization).

As to flow shaping, consider a volute that includes an ability to dynamically change angle of incidence. For example, at least the surface 1178 of the insert 1170 of FIG. 11 may be operatively coupled to a mechanism that can alter its shape. In such an example, the surface 1178 may be a variable volute geometry surface. In such an example, the surface 1178 may be movable, optionally independently of the raised mating surface 1177 such that mating is maintained by the raised mating surface 1177 while the surface 1178 changes shape (e.g., moving radially inwardly and/or radially outwardly to thereby alter volute geometry.

As an example, the insert 1170 of FIG. 11 may be formed of multiple pieces. For example, a component or components forming the surfaces 1178 and 1179 may be separable from a component or components forming other portions of the insert 1170. As an example, a component that forms the surfaces 1178 and 1179 may be fixed to another component (e.g., a disc like component) to form the insert 1170 (e.g., consider welding, use of adhesive, bolts, etc.).

As an example, a tongue may define in part a volute. In such an example, a tongue may be part of an insert and/or part of a turbine housing.

As an example, a shroud may have a stiffness that is determined in part by one or more features. For example, consider projected notches, blips, etc. on a shroud, proximate to an outer diameter. As an example, a loading mechanism may include press fit dowels and/or cast/machined projections on a housing. As an example, an insert may include features that cooperate with features that may extend from or recess into a turbine housing. For example, consider an insert with openings that can receive dowels that extend from a turbine housing. In such an example, the turbine housing may include recesses (e.g., apertures, etc.) that can receive dowels. As an example, dowels may be notched to position an insert axially. As an example, dowels may be shaped with respect to flow, for example, from a volute to a turbine wheel space (e.g., consider a vane shaped dowel, etc.).

Figure 12:
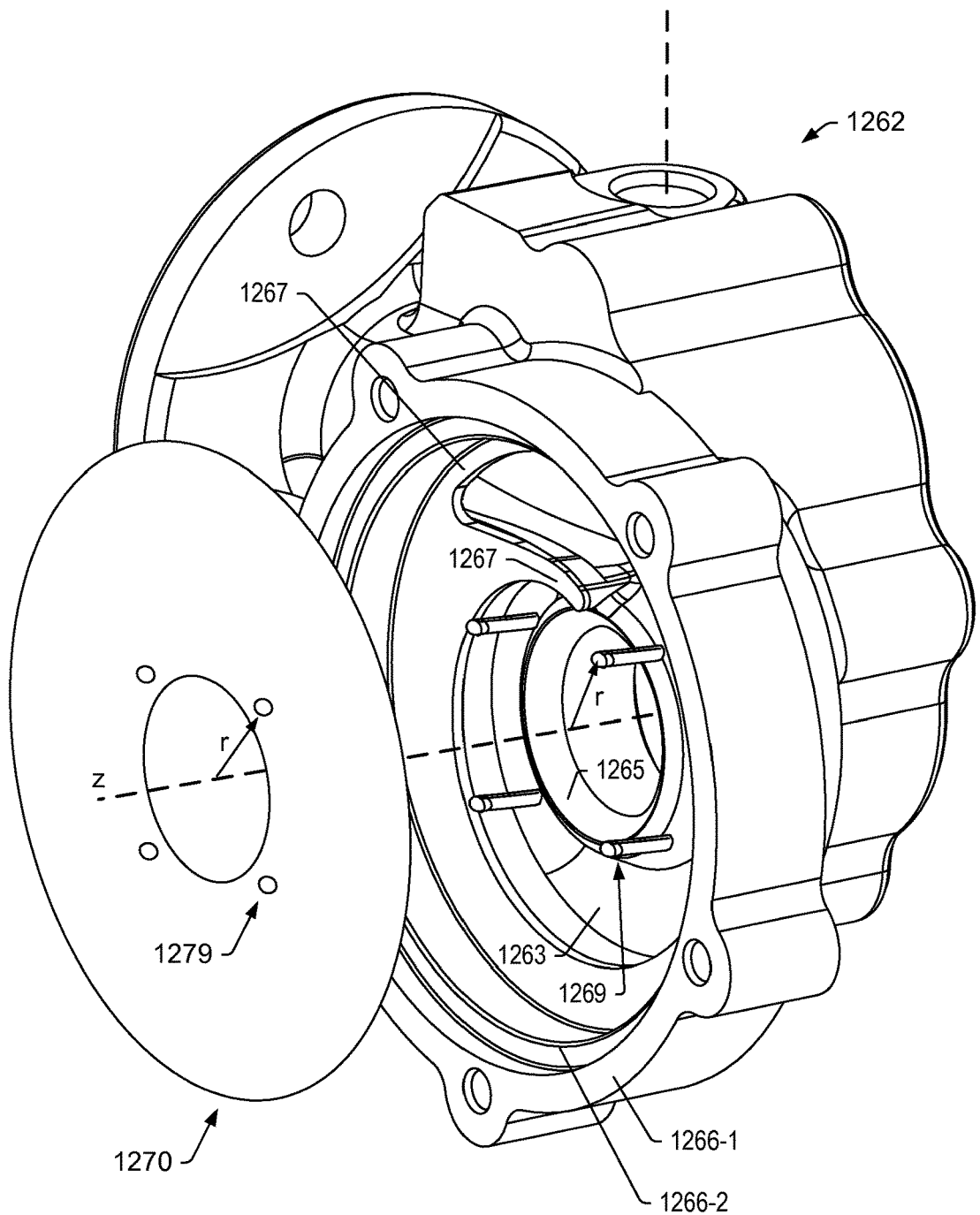
FIG. 12 shows a perspective view of an example of an assembly that includes an example of a turbine housing and an example of an insert.

FIG. 12 shows an example of a turbine housing 1262 and an insert 1270 where the turbine housing 1262 includes dowels 1269 that extend at least in part axially outwardly away from a shroud 1265 and a surface 1263 at a radial position that is greater than a diameter of a turbine wheel. Also shown are a mating surface 1266-1 and a recessed mating surface 1266-2.

As illustrated in the example of FIG. 12, the dowels 1269 may be received by apertures 1279 in the insert 1270. While the example of FIG. 12 shows the surface 1267 as being part of the turbine housing 1262, such a structural feature may optionally be part of the insert 1270, for example, consider the insert 1170 of FIG. 11. As an example, the dowels 1269 may provide one or more of support, loading, or another function. As shown, the dowels may include notches, for example, to achieve a desired axial alignment with respect to the insert 1270. As an example, the dowels 1269 may optionally be made of a material that does not conduct heat energy as readily as steel, which may act to diminish heat transfer between the insert 1270 and the turbine housing 1262. As an example, the dowels 1269 may be removal and insertable into the turbine housing 1262. As an example, a support feature or support features such as, for example, dowels, may be shaped cylindrically, flat, oval, teardrop, etc.

As an example, an adjustable volute surface may allow for altering an NR ratio of a turbine assembly. An NR ratio can be defined where A is the cross-sectional area of a volute at a tongue and where R is the radius to the dynamic center (e.g., where the dynamic center locates a point that divides a scroll area such that half the flow passes above and half the flow passes below the dynamic center).

For a turbine assembly, performance can be affected by changing the NR ratio of a turbine housing assembly. An adjustment to the A/R ratio may be used to alter flow capacity of a turbine assembly. For example, a smaller A/R ratio can increase exhaust gas velocity into a turbine wheel, causing the turbine wheel to spin faster at lower engine RPMs, which may give quicker boost rise. A smaller NR ratio may also tend to increase exhaust backpressure and reduce the maximum power at high RPM. Conversely, a larger NR ratio can lower exhaust gas velocity and delay boost rise, but the lower backpressure may result in better high-RPM power. As an example, a selected NR ratio may aim to bias performance toward a desired powerband.

As an example, a wall of a volute may be finished to reduce drag. For example, an insert may include a wall that forms part of a volute where the wall may be finished using one or more techniques (e.g., polishing, etc.). In such an example, the material of construction of the wall may differ from that of a cast turbine housing, for example, where the material of the wall may be amenable to finishing to achieve a finish that is finer than a finish that can be achieved for a cast turbine housing. As an example, a finish of a volute wall may reduce flow losses at or near an entrance to a turbine wheel space.

As an example, a turbocharger assembly can include a center housing; a turbine housing; and an insert disposed between the center housing and the turbine housing where a surface of the turbine housing and a first surface of the insert define a volute and where a surface of the center housing and a second surface of the insert define a chamber. In such an example, the assembly can include a turbine wheel where the insert includes an inner edge and an outer edge and where the inner edge defines a radial clearance with respect to an outermost edge of the turbine wheel.

As an example, an insert can include an annular ring portion and segments that extend at least in part radially inwardly from the annular ring portion.

As an example, an insert can include a load applied via contact with a center housing and via contact with a turbine housing, optionally including contact with one or more features such as dowels or other extensions that extend at least in part between the turbine housing and the insert.

As an example, a turbine housing can be a cast turbine housing, which may, for example, be machined (e.g., to form mating surfaces, appropriate clearances, etc.).

As an example, a turbine housing can include a wastegate opening and a wastegate shaft bore. For example, such a turbine housing may be fitted with a wastegate valve that includes a shaft that can be received at least in part in the wastegate shaft bore to control the position of a plug of the wastegate valve that can be positioned to close the wastegate opening and to open the wastegate opening.

As an example, an insert can be made of a material of construction that has a density that is less than a material of construction of the turbine housing. In such an example, mass of an assembly may be diminished. As an example, an insert may include a structural feature that can be received by a recess of a turbine housing to define a volute with respect to the turbine housing. In such an example, the structural feature may be of a lesser density material than that of the turbine housing. As an example, such a structural feature may be hollow, for example, formed as a shell (see, e.g., the insert 1170 of FIG. 11, which may include a shell portion that forms the raised mating surface 1177 and the surface 1178).

As an example, an insert can have a thermal conductivity that is less than a thermal conductivity of a turbine housing. As an example, an insert may be made of a resilient material, for example, to accept a load, to apply a biasing force, etc. As an example, an insert may be a resilient insert. As an example, an insert may include radial channels that form segments, which provide some amount of resiliency to the insert (e.g., to form a resilient insert).

As an example, a turbine housing can include a recessed annular surface that seats an insert. In such an example, the recessed annular surface can include a radius that exceeds a maximum radius of a volute. In such an example, the recessed annular surface can include an insert mating surface that extends radially inwardly to form an end of the volute.

As an example, a center housing can include a turbine side that includes extensions that include axial end surfaces that face a surface of an insert (e.g., a second surface where a first surface faces a turbine housing).

As an example, an insert may be supported at a first radius and supported at a second, different radius (e.g., by one or more features such as features of a turbine housing). In such an example, the insert can be supported at a third radius intermediate the first radius and the second radius.

As an example, a turbocharger assembly can include dowels that contact a turbine housing and that contact an insert. In such an example, the insert can include apertures (e.g., or slots, etc.) that receive at least a portion of dowels (e.g., an end of at least two of the dowels, etc.).

Although some examples of methods, devices, systems, arrangements, etc., have been illustrated in the accompanying Drawings and described in the foregoing Detailed Description, it will be understood that the example embodiments disclosed are not limiting, but are capable of numerous rearrangements, modifications and substitutions.

What is claimed is:

1. A turbocharger assembly comprising:
a center housing;
a turbine housing; and
an insert disposed between the center housing and the turbine housing wherein a surface of the turbine housing and a first surface of the insert define a volute and wherein a surface of the center housing and a second surface of the insert define a chamber, wherein the turbine housing comprises a recessed annular surface that seats the insert, wherein the recessed annular surface comprises a radius that exceeds a maximum radius of the volute, wherein the recessed annular surface comprises an insert mating surface that extends radially inwardly to form an end of the volute, wherein the volute is defined in part by a tongue, and wherein the end of the volute is at the tongue.

2. The turbocharger assembly of claim 1 comprising a turbine wheel wherein the insert comprises an inner edge and an outer edge wherein the inner edge defines a radial clearance with respect to an outermost edge of the turbine wheel.

3. The turbocharger assembly of claim 1 wherein the insert comprises an annular ring portion and segments that extend at least in part radially inwardly from the annular ring portion.

4. The turbocharger assembly of claim 1 wherein a load is applied to the insert via contact of the insert with the center housing and via contact of the insert with the turbine housing.

5. The turbocharger assembly of claim 1 wherein the turbine housing comprises a cast turbine housing.

6. The turbocharger assembly of claim 1 wherein the turbine housing comprises a wastegate opening and a wastegate shaft bore.

7. The turbocharger assembly of claim 1 wherein the insert comprises a material of construction that comprises a density that is less than a material of construction of the turbine housing.

8. The turbocharger assembly of claim 1 wherein the insert comprises a thermal conductivity that is less than a thermal conductivity of the turbine housing.

9. The turbocharger assembly of claim 1 wherein the insert comprises a resilient insert.

10. The turbocharger assembly of claim 9 wherein the resilient insert comprises radial channels that form segments.

11. The turbocharger assembly of claim 1 wherein the center housing comprises a turbine side that comprises extensions that comprise axial end surfaces that face the second surface of the insert.

12. The turbocharger assembly of claim 1 wherein the insert is supported at a first radius and supported at a second, different radius.

13. The turbocharger assembly of claim 12 wherein the insert is supported at a third radius intermediate the first radius and the second radius.

14. The turbocharger assembly of claim 1 comprising dowels that contact the turbine housing and that contact the insert.

15. The turbocharger assembly of claim 14 wherein the insert comprises apertures, wherein each of the apertures receives at least a portion of a corresponding one of the dowels.

16. The turbocharger assembly of claim 1 wherein the volute is a scroll that spirals with diminishing cross-sectional flow area for exhaust gas and wherein the scroll ends at the end of the volute.

17. The turbocharger assembly of claim 1 wherein the turbine housing is a unitary cast turbine housing and wherein the insert is a unitary component.

18. The turbocharger assembly of claim 17 wherein the volute is defined exclusively by two pieces, which are the turbine housing and the insert.

19. A turbocharger assembly comprising:
a center housing;
a turbine housing; and
an insert disposed between the center housing and the turbine housing wherein a surface of the turbine housing and a first surface of the insert define a volute and wherein a surface of the center housing and a second surface of the insert define a chamber, wherein the turbine housing comprises a recessed annular surface that seats the insert, wherein the recessed annular surface comprises a radius that exceeds a maximum radius of the volute, wherein the recessed annular surface comprises an insert mating surface that extends radially inwardly to form an end of the volute, wherein the turbine housing is a unitary cast turbine housing, wherein the insert is a unitary component, and wherein the volute is defined exclusively by two pieces, which are the turbine housing and the insert.

\* \* \* \* \*